United States Patent

McCartney, Jr. et al.

[11] Patent Number: 5,831,693
[45] Date of Patent: Nov. 3, 1998

[54] INTEGRATED LIGHT SENSOR FOR AN ACTIVE MATRIX LIQUID CRYSTAL DISPLAY PANEL

[75] Inventors: Richard Isaiah McCartney, Jr., Scottsdale; Kalluri R. Sarma, Mesa, both of Ariz.

[73] Assignee: Honeywell, Minneapolis, Minn.

[21] Appl. No.: 606,910

[22] Filed: Feb. 22, 1996

[51] Int. Cl.$^6$ .......................... G02F 1/136; G02F 1/1335; G02F 1/133
[52] U.S. Cl. .............................. 349/42; 349/70; 349/106; 349/108; 349/116
[58] Field of Search .................................. 359/55, 59, 60, 359/67, 68; 349/42, 70, 106, 108, 116

[56] References Cited

U.S. PATENT DOCUMENTS

| | | | |
|---|---|---|---|
| 4,300,818 | 11/1981 | Schachar | 351/7 |
| 4,655,552 | 4/1987 | Togashi et al. | 350/342 |
| 4,925,276 | 5/1990 | McMurray et al. | 350/342 |
| 4,952,031 | 8/1990 | Tsunoda et al. | 350/342 |
| 5,039,206 | 8/1991 | Wiltshire | 359/50 |
| 5,064,275 | 11/1991 | Tsunoda et al. | 359/55 |
| 5,446,564 | 8/1995 | Mawatari et al. | 359/72 |

Primary Examiner—William L. Sikes
Assistant Examiner—Julie Ngo

[57] ABSTRACT

The active matrix liquid crystal display panel comprises a matrix of predetermined color filters, arranged in a predetermined configuration within a viewing area, deposited on a first substrate, and a first plate of an activating element is deposited over the matrix of predetermined color filters. A plurality of second plates of the activating element is deposited on a second substrate opposite each color filter. When a predetermined second plate is activated, light is permitted to pass through the corresponding filter, the light exiting the first substrate having the color of the corresponding filter. A plurality of thin film transistors is deposited on the second substrate and forms the control elements, each control element corresponding to a corresponding second plate of the activating element, the control element selecting predetermined second plate in response to control signals. The display panel includes a liquid crystal material filled in a space between the first and second substrate. At least one photodiode is deposited on the second substrate outside the viewing area, the photodiode generating a voltage proportional to ambient lighting conditions around the exterior of the first substrate. The photodiode is fabricated utilizing the same steps utilized in fabricating the display panel.

10 Claims, 6 Drawing Sheets

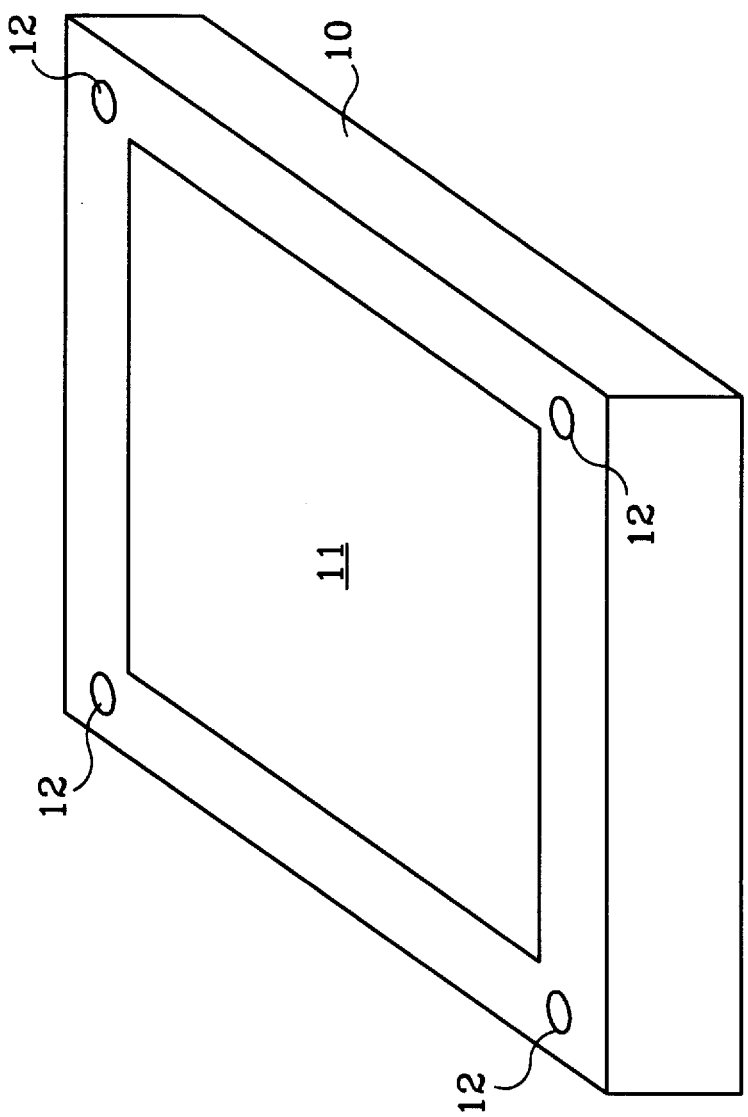

INTEGRATED LIGHT SENSOR FOR AN ACTIVE MATRIX LIQUID CRYSTAL DISPLAY PANEL

BACKGROUND OF THE INVENTION

The present invention relates to liquid crystal display panels, and more particularly, to self adjusting the display luminance of an active matrix liquid crystal display panel according to the ambient lighting.

In an environment which includes a display and in which the ambient light of the environment changes, it is desirable for the display brightness to also change. In a bright ambient light environment, the display needs to be very bright. However, such a bright display at night time (i.e., a dark/darker ambient environment) would be harsh to a viewer. For example, at night time, displays of an aircraft flightdeck need to be dim so that the displays are not blinding and distracting. The dim light permits the pilot to look out the window and see dimly lit objects that do not compete with the displays. Also, the dash of an automobile having liquid crystal displays needs to be dimmed in a darker environment, e.g., at night time, such that the internal lighting of the displays is not blinding to the driver. However, during the daylight hours (e.g., a bright ambient light environment) the display brightness should be increased for better viewing. It is customary, especially in an aircraft, where the ambient light changes quickly and the viewer workload is high, to somehow control the brightness of the display automatically.

Generally, in an aircraft, there are remote light sensors to the display. One remote light sensor is in the nose of the aircraft and looks forward of the aircraft and gives a sense of the general lighting out of the window of the aircraft. A local light sensor, usually mounted in the bezel of the display, senses how much light is impinging on the surface of the display. The brightness of the backlight of the display is controlled by an algorithm which combines the information from both sensors.

The building and fabrication of the active matrix liquid crystal display panel (sometimes referred to herein as display glass) is essentially the same technology used to fabricate integrated circuits (IC). Included in the fabrication of the display glass is the generation of thin film transistors, each thin film transistor acting as a switching element to control a corresponding display element. The fabrication and operation of such a display is more fully described in U.S. Pat. No. 5,088,806, entitled "Apparatus and Method for Temperature Compensation of Liquid Crystal Matrix Displays", and U.S. Pat. No. 5,110,748, entitled "Method for Fabricating High Mobility Thin Film Transistors as Integrated Drivers for Active Matrix Display", both patents being assigned to Honeywell Inc., the assignee of the present application.

The present invention integrates the function of sensing the ambient light onto the display glass achieving a more effective light sensing approach. The building of the light sensor(s) on the display glass utilizes the same steps required for the fabrication of the display glass; however, changed photo lithography masks are required. Thus, including the ambient light sensing function on the display glass, i.e. integrating the ambient light sensor(s) on the glass, results in a cost savings by making the generation of the light sensor(s) on the display glass a normal part of the display glass fabrication. This eliminates the need for the remote light sensors and the placement/installation thereof.

In addition, a feature of many backlight systems is an integral feedback path to control the brightness of the light source. Such a source can be controlled in a closed loop control system wherein a sensor monitors the lumen output of the lamp. This sensor's output is compared against a commanded input reference and appropriate control of the light source is applied to brighten or dim the backlight to cause the sensor feedback to match the command input.

The present invention integrates the function of sensing backlight intensity onto the display glass achieving a more effective light sensing approach. Including the backlight luminance feedback control sensor(s) on the display glass results in a cost savings by reducing the parts count of the system and more effectively senses the backlight by sensing the light impinging on the display glass rather than, for instance, the light eminating from the source.

SUMMARY OF THE INVENTION

Therefore, there is provided by the present invention an apparatus and method for integrating light sensors into an active matrix liquid crystal display panel. The active matrix liquid crystal display panel comprises a matrix of predetermined color filters, arranged in a predetermined configuration within a viewing area, deposited on a first substrate. A first plate of an activating electrode is deposited over the matrix of predetermined color filters, the activating electrode being a clear material. A plurality of second plates of the activating electrode is deposited on a second substrate opposite each color filter, such that when a predetermined second plate is activated, light is permitted to pass through the corresponding filter, the light exiting the first substrate having the color of the corresponding filter. A plurality of control elements, each control element corresponding to the second plates of the activating electrode, selects a predetermined second plate in response to control signals. The display panel includes a liquid crystal material filled in a space between the first and second substrate. At least one photodiode is deposited on the second substrate outside the viewing area, the photodiode generating a voltage proportional to ambient and/or backlighting conditions around the peripheral of the first substrate.

Accordingly, it is an object of the present invention to provide an active matrix liquid crystal display panel having ambient light sensors integrated therein.

It is a further object of the present invention to provide an active matrix liquid crystal display panel having rear looking backlight sensors integrated therein.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 shows a topographical view of the display panel showing the placement of the light sensors of the preferred embodiment of the present invention;

DETAILED DESCRIPTION

Figure 1:
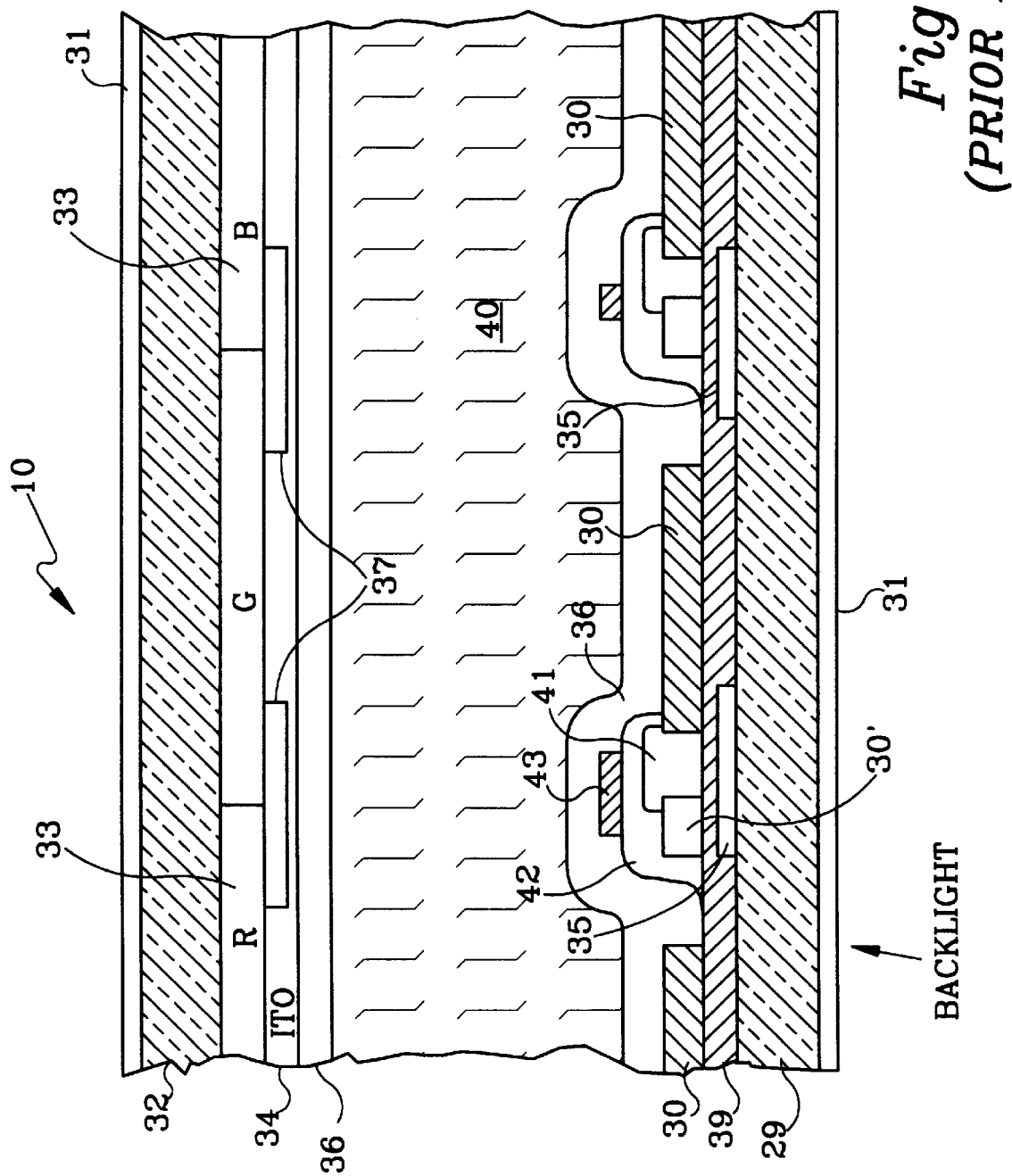
FIG. 1 shows a cross-sectional view of a portion of an active matrix liquid crystal display of the prior art.

Referring to FIG. 1, there is shown a cross-sectional view of a portion of an active matrix liquid crystal display of the prior art capable of displaying a color image. An active matrix liquid crystal display panel 10 includes an upper glass substrate 32 and a lower glass substrate 29, each glass substrate 29, 32 having an exterior polarizing element 31. The upper glass substrate 32 has deposited thereon filter material 33, the filter material being a red (R), green (G) and blue (B) material well known to those skilled in the art. The techniques of depositing these materials are essentially the same techniques of photo lithography as used in the fabrication of integrated circuits (IC), also well known to those skilled in the art. A black matrix material 37 (chrome/chromium oxide—a material absorbing to light) is deposited to prevent light from entering the display panel 10 and impinging on the transistor which is on the opposite glass substrate 29, which will be described hereinunder. A transparent conductor (indium tin oxide, ITO) 34 is deposited to form one plate (a common plate) of the pixel elements. Finally, a clear plastic 36 (a polyimide-liquid crystal alignment material) is deposited on the upper glass substrate 32.

The lower glass substrate 29 has deposited thereon the second (or opposing) plate of the electrode 30. The material is the ITO material and an individual plate 30 is deposited opposite each filter 33. In this manner each color pixel (dot) can be controlled, i.e., each green dot, red dot, blue dot is controlled individually.

The control of these dots is performed by corresponding thin film transistor (TFT) at each intersection. The transistor comprises a light shield 35 (such as a thin layer of chromium material) to inhibit the backlight from impinging on the light sensitive TFT channel region. A silicon dioxide dielectric layer 39 is then used to electrically isolate the light shield layer 39 from the subsequent TFT layers above. Some indium tin oxide 30' material is deposited which forms the source part of the TFT. Individual electrode plates 30 form the drain part of the TFT. Amorphous silicon 41 (a-Si) is deposited, and then a silicon nitride (Si $N_x$) 42 material is deposited. An aluminum 43 deposit forms the gate of the transistor (TFT). Lastly, a layer of polyimide is formed to serve as an alignment layer for the liquid crystal. Each TFT is controllable, allowing each color dot to be controlled. Sealed between the two glass substrates 29, 32 is a liquid crystal material 40. Further details of the fabrication and operation can be had by referring to the aforementioned patents.

Referring to FIG. 2, there is shown the active matrix liquid crystal display panel 10 of the preferred embodiment of the present invention. The display panel 10 includes the viewing area 11, and in the preferred embodiment light sensors 12 are placed in the 4 corners of the display panel. The light sensors 12 are integrated internal to the display panel and will now be described. It will be recognized by those skilled in the art that the light sensors 12 can be placed almost anywhere on the periphery of the display panel 10, i.e., outside the viewing area 11.

Figure 3A:
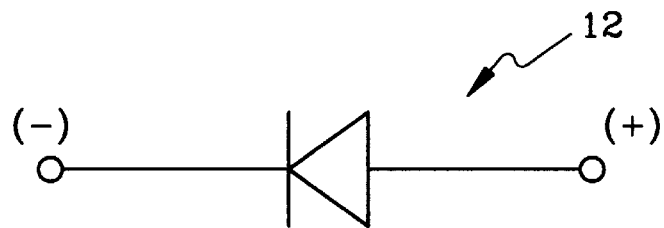
FIG. 3, which comprises FIGS. 3A, B, and C, shows a schematic, cross-sectional view, and a top view of the photodiode of the present invention.

The present invention fabricates at least one photodiode (sensor) 12 on the lower glass substrate 29 outside the viewing area of the display panel 10, using effectively the same process steps as those used to fabricate the display panel 10, but makes the necessary modifications to the masks, to include the fabrication of a photodiode 12 instead of a transistor. Referring to FIGS. 3A, B, C, which together comprise FIG. 3, shows a schematic, cross-sectional view and a top view of the photodiode 12. On the lower glass substrate 29 a light shield (chromium) 35 is deposited to prevent the backlight from impinging on the photodiode 12. First, a cathode is formed from the deposition of the ITO material 30. The photo sensitive semiconductor material amorphous silicon (a-Si) 41 is then deposited on the cathode 30. An insulator material silicon nitride (Si $N_x$) 42 is deposited, and finally an anode (aluminum) 43 is deposited over the photo sensitive material 41. In order for the ambient light entering the display panel 10 through the upper glass substrate to impinge on the amorphous silicon 41, holes 44 are etched into the aluminum anode 43. These process steps are the same steps included in the process steps described above in conjunction with the fabrication of the display panel 10.

Figure 4:
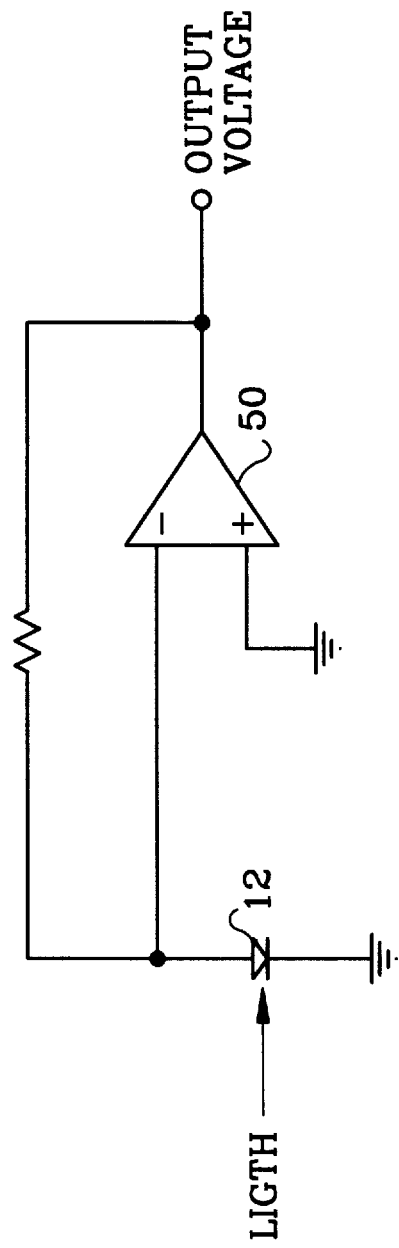
FIG. 4 shows a circuit diagram of the receiver circuit of the photodiode.

Referring to FIG. 4, there is shown a logic diagram of the control circuit of the backlight. The photodiode 12 senses the ambient light. The photodiode 12 is coupled to an amplifier 50 which outputs a voltage directly proportional to the intensity of the light. The voltage is operatively coupled to the backlight (not shown) such that when the intensity of the ambient light is high, the voltage is high providing a higher intensity of backlight, and conversely, when the ambient light is low, the backlight is dimmed. Where more than one photodiode 12 is used, any number of ways well known to those skilled in the art can be implemented to utilize the multiple outputs, e.g., the outputs are inputted to a summing device and averaged, or inputted to a computer having an algorithm to process the voltages in some predetermined manner (e.g., weighted, combined with input from a remote light sensor, etc. . . . ).

In an alternative embodiment of the photodiode, a sensor to control the backlight intensity can be fabricated. What is to be measured is the intensity of the backlight (compared to a reference command voltage). Thus if the intensity of the backlight is to be, for example, 400 foot candles, commanded by the reference voltage, the intensity of the backlight can be increased or decreased by changing the voltage to the backlight until the specified intensity is reached.

Figure 3B:
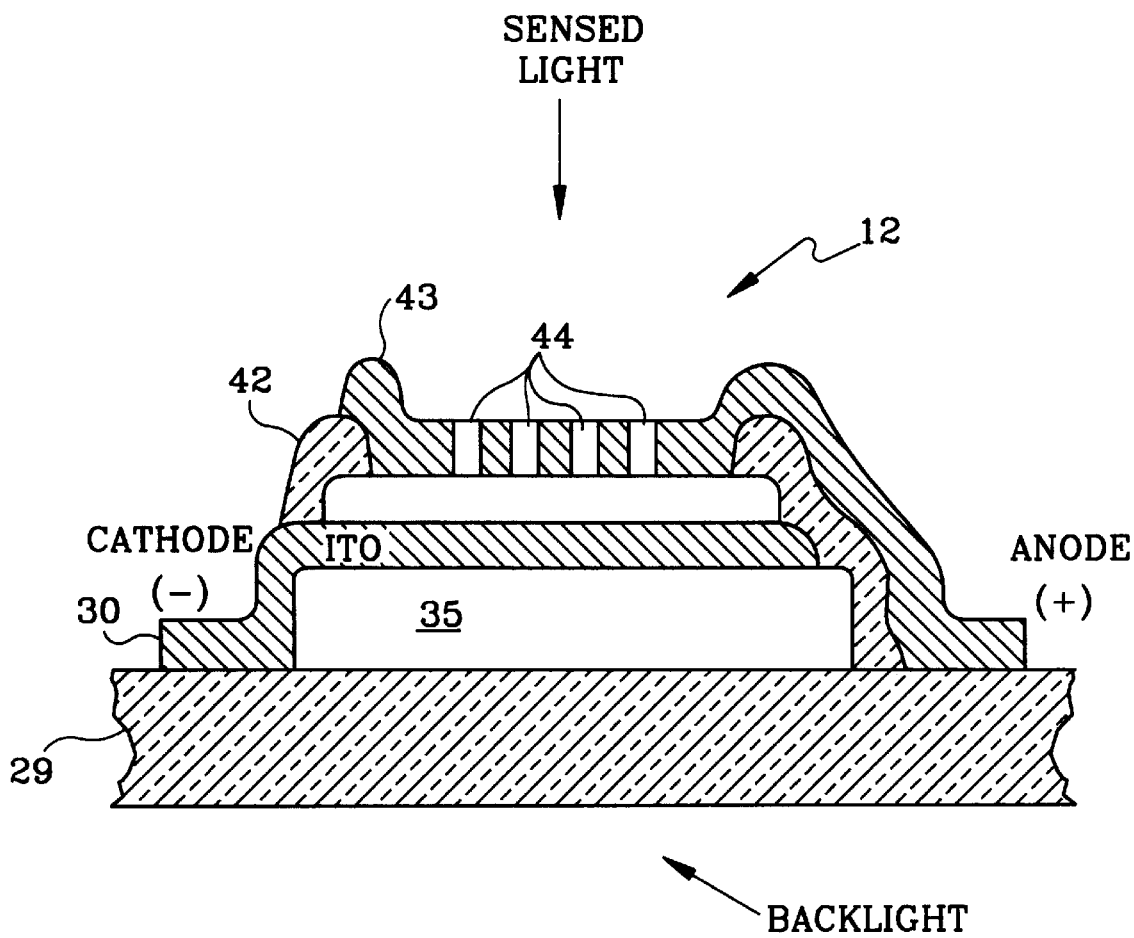
Figure 3C:
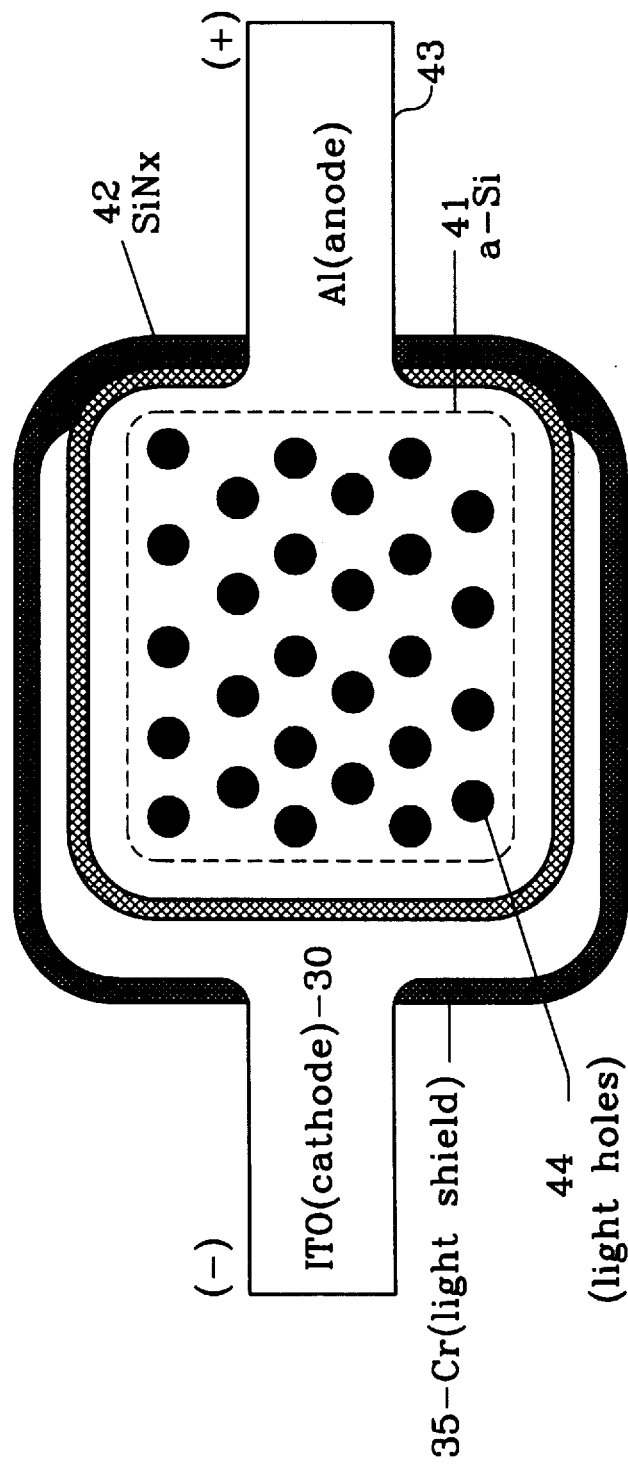

This photo sensor facing the backlight cavity can be integrated into the display panel 10 by:

a) eliminating the backlight shield 35 of FIG. 3B, and b) eliminating the holes 44 in the anode.

Figure 5:
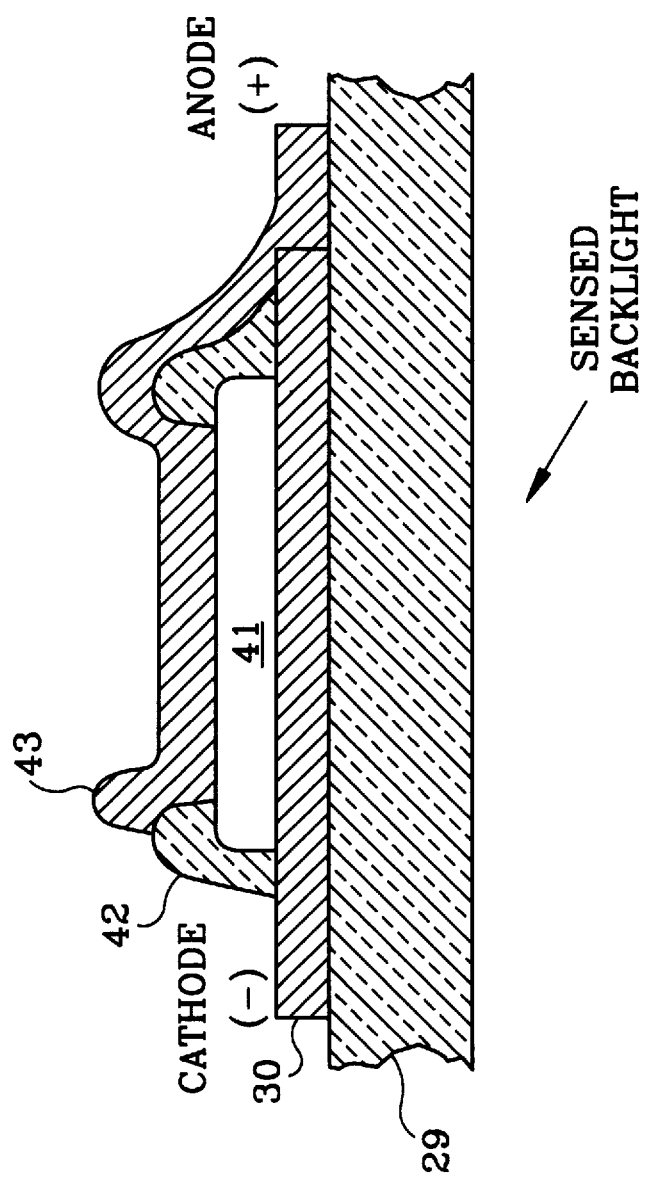
FIG. 5 shows a cross-sectional view of an alternative embodiment of a photodiode of the present invention.

This alternative embodiment is shown in FIG. 5. In this manner, the ambient light doesn't get through the aluminum 43, and the backlight is permitted to impinge the photo sensitive material 41 through the transparent ITO layer 30 on the glass substrate 29.

The photodiode of FIG. 3 and the photodiode of FIG. 5 can be used together; namely, the former indicates the ambient light and the latter measures the actual amount of the backlighting. The backlighting is then controlled to get the intensity to a desired level based on the measured ambient lighting.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. An active matrix liquid crystal display panel comprising:

a) a matrix of predetermined color filters, arranged in a predetermined configuration within a viewing area, deposited on a first substrate;

b) a first plate of an activating means deposited over the matrix of predetermined color filters, the activating means being a clear conducting material;

c) a plurality of second plates of the activating means, deposited on a second substrate opposite each color filter, such that when a predetermined second plate is activated, light is permitted to pass through the corresponding filter, the light exiting the first substrate having the color of the corresponding filter;

d) a plurality of control means, each control means corresponding to each of the second plates of the activating means, for selecting a predetermined second plate in response to control signals;

e) a liquid crystal material filled in a space between the first and second substrate;

f) at least one photodiode deposited on the second substrate outside the viewing area, the photodiode sensing ambient lighting conditions around the exterior of the first substrate;

g) a backlight positioned exterior to the second substrate; and h) a control circuit, connected to the photodiode and the backlight, generating a voltage proportional to ambient lighting and controlling the intensity of the light outputted from the backlight based on the ambient lighting sensed by the photodiode.

2. An active matrix liquid crystal display panel according to claim 1, wherein the control means are thin film transistors deposited on said second substrate.

3. An active matrix liquid crystal display panel according to claim 2 wherein the predetermined color filters include:

a) a red filter;

b) a green filter;

c) a blue filter all arranged in a predetermined geometric pattern.

4. An active matrix liquid crystal display panel according to claim 3 wherein the first and second substrate is a glass substrate.

5. An active matrix liquid crystal display panel according to claim 1, further comprising at least one reverse photodiode deposited on the second substrate outside the viewing area, the reverse photodiode generating a voltage proportional to the intensity of the light outputted from the backlight.

6. An active matrix liquid crystal display panel according to claim 5, wherein the voltage outputted from the reverse photodiode is used to control the output of the light from the backlight, the output of the light from the backlight being determined as a function of the ambient light determined from the photodiode.

7. An active matrix liquid crystal fabrication method comprising fabricating a first glass substrate with a color filter array and the common first plate of an activating means, and fabricating the second glass substrate with the thin film transistor array with the plurality of second plates of the activating means opposite to the respective color filter array elements on the first glass substrate, and fabrication of the second glass substrate further comprising fabrication of at least one photodiode out side the display viewing area for the purpose of sensing the display ambient light level to control the backlight intensity and the display brightness.

8. An active matrix liquid crystal display fabrication method according to claim 7, where in the thin film transistors and the photodiodes are fabricated using the photosensitive amorphous silicon semiconductor.

9. An active matrix liquid crystal display fabrication method according to claim 8, where in the fabrication processes for fabricating the amorphous silicon thin film transistors encompass the fabrication processes for fabricating the amorphous silicon photodiodes.

10. An active matrix liquid crystal display fabrication method according the claim 7, where in at least two photodiodes are fabricated outside the display viewing area, at least one photodiode sensing the display ambient light intensity through the first glass substrate, and at least one photodiode sensing the display backlight intensity through the second glass substrate.

\* \* \* \* \*